3,565,794
ESTER AND AMIDE COMPOUNDS OF PYROGLUTAMIC ACID AS SELECTIVE SOLVENTS FOR PETROLEUM HYDROCARBONS

Pierre Charles Elie Pigache, Lille, Nord, France, assignor to Leanord, Nord, France, a French company
No Drawing. Filed Mar. 15, 1967, Ser. No. 623,205
Claims priority, application France, Mar. 15, 1966, 53,411
Int. Cl. C10g 21/20
U.S. Cl. 208—326      2 Claims

ABSTRACT OF THE DISCLOSURE

This invention relates to new ester and amide compounds of pyroglutamic acid, possessing remarkable solvent properties, for use notably in selective extraction of aromatic compounds in petroleum products.

---

The present invention deals with new ester and amide compounds of pyroglutamic acid, possessing remarkable solvent properties, for use notably in selective extraction of aromatic compounds in petroleum products.

It is known that L-glutamic acid gives, under dry heat of between 160° and 200° C., a mixture of L-pyroglutamic acid and DL-pyroglutamic acid through internal amidification and formation of water. Racemization becomes more considerable the higher the temperature and the longer the time of heating.

Methylic, ethylic, n-propylic and n-butylic esters of L-pyroglutamic acid have already been derived, through heating the corresponding glutamic diesters up to 140° C. These diesters can be obtained by passing a current of gaseous hydrochloric acid into L-glutamic acid in suspension in a very large excess of alcohol. After elimination of the excess alcohol and heating up to 140° C., decomposition of the glutamic diester gives the desired pyroglutamic ester.

However, this classic preparation process for pyroglutamic esters is long and costly, as it necessitates the use of a large quantity of alcohol in relation to the acid, and cannot be applied in practice except to alcohols having a boiling point below 110–120° C.

The process covered by the present invention makes it possible to obtain industrially, by a simple low-cost method, numerous L and DL pyroglutamic acid esters heretofore unknown.

These esters have characteristic, very selective, solvent properties.

These selective solvent properties of pyroglutamic acid esters can be attributed to the presence, in their molecule, of a lactamous and an ester function. In the case of esters of alkoxyethanols, the ether-oxide function reinforces the solvent properties caused by the lactamous and ester functions.

The objective of the invention is new ester and amide compounds of pyroglutamic acid, of the general formula:

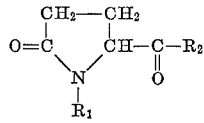

wherein $R_1$ represents an atom of hydrogen or a substituted or unsubstituted alkyl, alkenyl, aralkyl, alkoxy, aralkoxy, alkylamino or alkylpolyol radical; and $R_2$ represents a substituted or unsubstituted amino, alkoxy, aryloxy, cycloalkoxy or heteroalkoxy radical.

The invention pertains to pyroglutamic esters of methanol, ethanol, n-propanol, isopropanol, n-butanol, isobutanol, pentanol, methylglycol, ethylglycol, propylglycol, butylglycol, hexylglycol, methoxydiglycol, ethoxydiglycol, butoxydiglycol, diethylethanolamine, dimethylethanolamine, N-hydroxyethylmorpholine, N-ethyl-pyroglutamate of ethanol, pyroglutamate of sobitol, pyroglutamate of lauric alcohol, N-N-diethylpyroglutamide, pyroglutanilide.

The invention also pertains to a process for manufacture of pyroglutamic esters from primary and secondary alcohols of the aliphatic, alicyclic, aromatic and heterocyclic series, consisting of heating glutamic acid at about 160–180° C. or until water is almost totally eliminated, permitting it to cool down to 120° C. before adding esterizing alcohol, causing a heat reaction, then eliminating the water from reaction through azeotropic distillation with an aromatic hydrocarbon such as benzene, toluene or xylene and isolating pure pyroglutamic ester from the alcohol by distillation under pressure below atmospheric pressure.

Natural L-glutamic acid may be used in this process to obtain a mixture of L- and racemic esters, as well as synthesized DL glutamic acids.

The esterification reaction can be catalyzed by the addition of small quantities of at least one strong acid, notably sulfuric, phosphoric, polyphosphoric, benzenesulfonic or paratoluene-sulfonic acids.

The invention also pertains, as regards new industrial products, to substances constituted, at least in part, by at least one compound of pyroglutamic acid according to the invention, which are solvents for benzenic hydrocarbons such as benzene, toluene, xylenes, naphthalene, paired double-linked polyethylenic hydrocarbons such as cyclopentadiene, butadiene, isoprene, acetylene, glucides such as glucose, fructose or saccharose, as well as their hydrogenated products such as sorbitol and mannitol, natural, artificial and synthetic polymers such as ethylcellulose, cellulose acetate, polyvinylchloride, polyvinylacetate, polyvinylic alcohol and the compounds of the aromatic series, notably colorants, as well as polar solvents such as water, alcohols, ether-oxides, esters, ketones, amines and halogenated derivatives.

Such solvents are constituted by a clear water white solution, liquid at normal room temperature, and 80 to 90% composed of at least one methylic, ethylic, propylic or butylic alcohol ester.

Using this invention, such solvents can be employed to separate paired, double-linked, unsaturated, and similar aromatic hydrocarbons in a mixture of hydrocarbons. Aromatic hydrocarbons can also be selectively extracted from a mixture of aliphatic, alicyclic and aromatic hydrocarbons such as those which are frequently encountered in a petroleum fraction.

The solvent properties also allow the selective extraction of butadiene from a mixture comprising butane, butenes and butadiene.

Glutamic esters, according to the invention, of methylic, ethylic, propylic and butylic alcohols are solids with a melting point of about 40–60° C., and thus can be used as solvents above these temperatures.

Alkoxyethanol esters, according to the invention, are all liquids at normal room temperature: their solidification points are below minus 20° C., and they remain liquid down to minus 50° C.

Pyroglutamic acid esters of the present invention are not easily miscible with monoethylenic hydrocarbons such as: propylene, butenes, isobutene, cyclohexene.

They are not miscible with aliphatic and alicyclic hydrocarbons such as: propane, the butanes, pentanes, hexanes, heptanes, cyclohexane, decaline.

These quite unusual solvent properties of the pyroglutamic acid esters of the present invention mean that

EXAMPLE 1

Preparation of ethyl pyroglutamate

In a 5-liter glass Pyrex reactor, equipped with an agitation device, a thermometer, and a cooling jacket provided with a downwardly flowing refrigerant, there are placed about 200 grams of L-glutamic acid. The reactor and its contents is then heated at 160–170° C. The glutamic acid melts and changes into pyroglutamic acid. Water formed by the reaction is eliminated by the refrigerant.

To the melted mass there is added, in small quantities, about 200 grams of glutamic acid. In this way dehydration is very regular and there is no tendency to carbonization.

After 3 or 4 hours, 15 moles (2,205 grams) of glutamic acid are thus completely dehydrated. About 90% of the water is removed.

The melted mass is then slowly cooled, all the while being stirred to prevent solidification.

When the temperature has reached 110–120° C., the flow of refrigerant is reversed and the reactor is topped with a separator permitting the esterification water to be eliminated as it is formed. 1.8 liters of 95% ethylic alcohol, containing 20 grams of paratoluenesulfonic acid is then added carefully to the reactor; the well-stirred mass of pyroglutamic acid dissolves rapidly in the alcohol; when it is dissolved 0.450 liter of benzene or toluene is added, and heating is continued for about 15 hours until all water has been eliminated. The alcohol and benzene which have not reacted are then removed by distillation at atmospheric pressure. Then, under reduced pressure, the ethyl pyroglutamate is distilled. The fraction which passes off between 140–145° C. under a pressure of 1 mm. of mercury is recovered. The ester crystalizes slowly; its fusion point is 55° C. The yield for this operation is 90% of the theorical yield. This process is applicable to methyl, propyl and butyl alcohols.

EXAMPLE 2

Preparation of ethylglycol pyroglutamate

The procedure is as in Example 1 for the preparation of pyroglutamic acid in using glutamic acid. When the temperature of the pyroglutamic acid has been lowered to 125° C. add, slowly and under agitation, 2,130 grams (23.4 moles) of ethylglycol and, lastly, a small quantity of catalyzer and heat at boiling for 4–5 hours, condensing ethylglycol vapor by means of the upward flowing refrigerant. At the end of this time, add 220 grams of xylene to the reactor and azeotropic entrainment of the water through the separator is carried on. This entrainment requires about 12 hours. When all water has been eliminated, the excess xylene and ethylglycol are distilled under atmospheric pressure, then under reduced pressure the ethylglycol pyroglutamate and fraction which distills between 170–180° C. under 1 mm. of mercury is recovered.

A viscous colorless liquid is obtained; its boiling point it 275° C. below atmospheric pressure; its fusion point is −24° C.

Yield for this operation is 80% of the theoretical yield.

This process is applicable to the preparation of all alkoxyethanol esters.

Methylglycol pyroglutamate distills at 195° C. under a pressure of 4 mm. of mercury.

Butylglycol pyroglutamate distills at 170–180° C. under a pressure of 1 mm. of mercury.

EXAMPLE 3

Table of solvent properties of ethylglycol pyroglutamate

| Substance | Solubility |
|---|---|
| Acetylene gas | Soluble. |
| Benzene | Soluble when cold. |
| Toluene | Soluble when cold. |
| Xylene | Soluble when cold. |
| Naphthalene | Soluble at 65° C. |
| Anthracene | Soluble at 120° C. |
| Essence of turpentine | Soluble when cold. |
| Cyclohexane | Insoluble. |
| Cyclohexene | Insoluble. |
| Liquified butane | Insoluble. |
| Liquified butene | Very slightly soluble. |
| Butadiene | Soluble. |
| Saturated aliphatic hydrocarbons | Insoluble. |
| Paraffin | Insoluble. |
| Tetraline | Soluble. |
| Decaline | Insoluble. |
| Cyclopentane | Insoluble. |
| Cyclopentene | Insoluble. |
| Cyclopentadiene | Soluble. |
| Dicyclopentadiene | Insoluble. |
| Stearic acid | Insoluble. |
| Oleic acid | Soluble. |
| Fatty linseed oil acids | Soluble. |
| Polyvinylchloride | Soluble at 120° C. |
| Ethylcellulose | Soluble. |
| Cellulose acetate | Soluble. |
| Glucose | Soluble at 100° C. No precipitation when cold. |
| Saccharose | Same as glucose. |
| Sorbitol | Same as glucose. |
| Polyester fiber colorants | Soluble. |
| Vat dyes | Soluble. |
| Dispersed colorants | Soluble. |

This table illustrates the widespread solvent properties of pyroglutamic acid esters. It can be seen more specifically that hydrocarbons are not soluble in such esters unless they contain at least 2 paired double bonds.

EXAMPLE 4

Preparation of ethyl N-ethylpyroglutamate (Formula I with $R_1=C_2H_5$, $R_2=OC_2H_5$)

100 grams of ethyl pyroglutamate prepared according to Example 1 are placed in a reactor; 100 grams of potassium carbonate are added, and a slight excess of ethyl bromide and a solvent (toluene or methylethylketone).

The mixture is heated for several hours at the boiling point of the solvent; carbonic gas is given off in abundance.

After cooling, the potassium carbonate and potassium bromide are filtered and the solvent is distilled under atmospheric pressure, and then distilled under pressure of 1 mm. of mercury. The fraction which passes at 100–120° C. is recovered. Yield: 70%.

EXAMPLE 5

Preparation of sorbitol pyroglutamate (Formula I with $R_1=H$,
$R_2=$—O—$CH_2$—$(CHOH)_4$—$CH_2OH$)

A mole of pyroglutamic acid (129 grams) is prepared in a reactor as in Example 1. When water from reaction has been completely eliminated, the mass is cooled to about 130° C. and a mole of crystallized sorbitol (182 grams) is added to it in one operation; it is heated for several hours to about 130° C.; this mixture becomes progressively homogeneous, and its acid index becomes regularly lower. At the end, a slightly yellowish resinous mass is obtained, composed of sorbitol monoester of pyroglutamic acid. This product is strongly hygroscopic. This process is applicable to all polyols.

EXAMPLE 6

Preparation of pyroglutamate from lauric alcohol (Formula I with $R_1$=H, $R_2$=—$OC_{12}H_{25}$)

One easily prepares alcohol esters of high molecular weights by an interesterification reaction between ethyl or methyl pyroglutamate and alcohol.

A mole of ethyl pyroglutamate, a mole of pure lauric alcohol and 20 grams of potassium carbonate or paratoluenesulfonic acid to catalyze the reaction, are placed in a reactor. The mixture melts at about 50° C. and the temperature is raised to 140° C. for about 12 hours; when all the ethyl alcohol from the reaction has been eliminated, the melted mass is poured into 2 liters of boiling water to eliminate the catalyzer. The organic layer is recovered and recrystallized twice in benzene and twice in acetone. There is thus obtained 210 grams (yield: 70%) of a white crystallized product which melts at 63° C. and which is composed of pure lauryl pyroglutamate.

EXAMPLE 7

Preparation of N-N-diethylpyroglutamide (Formula I with $R_1$=H

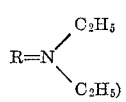

)

In a flask covered with an upward flowing refrigerant, a mole of ethyl pyroglutamate and 1.1 mole of diethylamine are mixed together; it is then heated about 2 hours at the boiling point of diethylamine, until the basicity index of the surrounding medium becomes very weak.

The excess of amine and ethyl alcohol formed in the reaction is then distilled. A viscous liquid formed of pure N-N-diethylpyroglutamide is obtained.

EXAMPLE 8

Preparation of pyroglutanilide (Formula I with $R_1$=—H, $R_2$=—NH—$C_6H_5$)

A mole of pyroglutamic acid is prepared in a reactor as in Example 1, and 1.1 mole of aniline is immediately added; it is then heated about 3 hours towards 160° C.

When the reaction is finished, the mixture is allowed to solidify; it is then dissolved in boiling water and boiled for some time with activated charcoal to make it lose color; the boiling liquid is filtered. On cooling of the solution, it crystallizes into a white solid formed of pure pyroglutanilide (fusion point: 194° C.). Yield: 90%.

The examples below show the selective extraction of aromatic hydrocarbons by the esters of pyroglutamic acid according to the inventions.

EXAMPLE 9

Extraction of aromatic hydrocarbons from a mixture 5 cm.³ of ethylglycol pyroglutamate is shaken with 5 cm.³ of a benzene-heptane mixture, and the equilibrium between the phases is achieved at 22° C. The relative percentages of hydrocarbons in each phase is determined by chromatography in the gaseous phase.

The following results are obtained:

| Aromatics in initial mixture of hydrocarbons (percent by weight) | Refined material (spent mixture) (grams) | Aromatics in refined mixture [1] (percent by weight) | Pyroglutamic extract (grams) | Aromatics in extract [1] (percent by weight) |
| --- | --- | --- | --- | --- |
| 12.5 | 3.3 | 8 | 5.9 | 66.6 |
| 24 | 3.1 | 17.5 | 6.1 | 74 |
| 35.5 | 3.0 | 24 | 6.3 | 80 |
| 46 | 2.6 | 28 | 6.8 | 78 |
| 56 | 2.4 | 34 | 7.2 | 77 |
| 66 | 2.0 | 39 | 7.6 | 77 |

[1] Percentage of aromatics relative to the mixture of hydrocarbons extracted.

EXAMPLE 10

Extraction of aromatic hydrocarbons with the aid of a mixture of ethylglycol pyroglutamate and water The selectivity of the extraction is improved vis-a-vis aromatic hydrocarbons by adding water to ethylglycol pyroglutamate (20% water, 80% pyroglutamate).

7 cm.³ of ethylglycol pyroglutamate with water added (20% of volume) is shaken with 3 cm.³ of a benzene-heptane mixture.

The following results are obtained:

| Aromatics in initial mixture of hydrocarbons (percent by weight) | Refined material (cm.³) | Aromatics in refined material (percent by weight) | Extract | Aromatics in extract (percent by weight) |
| --- | --- | --- | --- | --- |
| 46 | 2.3 | 29 | 7.7 | 91 |
| 66 | 1.9 | 44 | 8.1 | 92 |

EXAMPLE 11

Extraction of xylenes from a heptane-xylene mixture

Xylene can be extracted from a heptane-xylene mixture by shaking 5 cm.³ of ethylglycol pyroglutamate with 5 cm.³ of a xylene-heptane mixture.

The following results are obtained:

Aromatics in initial mixture of hydrocarbons (percent by weight) _____ 56
Refined material (grams) _____ 6.9
Extract (grams) _____ 2.7
Aromatics in extract (percent by weight) _____ 82

EXAMPLE 12

Extraction with a mixture of water-ethylglycol pyroglutamate

Selectively of extraction is improved if, in this case, water is added to ethylglycol pyroglutamate.

To do this, 5 cm.³ of a xylene-heptane mixture is shaken with 5 cm.³ of ethylglycol pyroglutamate with additional water (5% of volume).

The following results are obtained:

Aromatics in initial mixture of hydrocarbons (percent by weight) _____ 56
Refined material (cm.³) _____ 4.1
Extract (cm.³) _____ 5.9
Aromatics in extract (percent by weight) _____ 85

Of course, the invention is not intended to be limited to the examples presented. It has numerous variations, accessible to an experienced researcher, according to the applications envisaged, without leaving the general sphere of the invention.

What is claimed is:

1. A separation process for hydrocarbons selected from the group consisting of diolefins and aromatics which comprises solvent extracting said hydrocarbons from petroleum products containing them with a solvent consisting essentially of ethylglycol pyroglutamate.

2. A process according to claim 1 wherein said solvent includes from 5 to 20 percent by volume of water.

References Cited

UNITED STATES PATENTS

| | | | |
| --- | --- | --- | --- |
| 2,092,739 | 9/1937 | Van Dijk | 208—326 |
| 2,771,494 | 11/1956 | Weedman | 208—326 |
| 2,790,000 | 4/1957 | Norman et al. | 260—326.3 |
| 2,790,001 | 4/1957 | Purvis | 260—534 |
| 2,933,448 | 4/1960 | Morin et al. | 208—326 |
| 3,210,259 | 10/1965 | Cornell et al. | 260—674 |

HERBERT LEVINE, Primary Examiner

U.S. Cl. X.R.

252—357; 260—326.3, 534, 674